(12) United States Patent
Odom

(10) Patent No.: US 10,702,100 B2
(45) Date of Patent: Jul. 7, 2020

(54) STADIUM BARBEQUE GRILL

(71) Applicant: Mark W. Odom, Shreveport, LA (US)

(72) Inventor: Mark W. Odom, Shreveport, LA (US)

( * ) Notice: Subject to any disclaimer, the term of this patent is extended or adjusted under 35 U.S.C. 154(b) by 461 days.

(21) Appl. No.: 15/165,554

(22) Filed: May 26, 2016

(65) Prior Publication Data

US 2016/0345774 A1 Dec. 1, 2016

Related U.S. Application Data

(60) Provisional application No. 62/168,176, filed on May 29, 2015.

(51) Int. Cl.
*A47J 37/07* (2006.01)
*A47J 37/06* (2006.01)

(52) U.S. Cl.
CPC ....... *A47J 37/0763* (2013.01); *A47J 37/0623* (2013.01); *A47J 37/0786* (2013.01); *A47J 2037/0795* (2013.01)

(58) Field of Classification Search
CPC .......................... A47J 37/0786; A47J 37/0763

USPC ..................................................... 126/214 D
See application file for complete search history.

(56) References Cited

U.S. PATENT DOCUMENTS

| | | | | |
|---|---|---|---|---|
| 5,694,917 A | * | 12/1997 | Giebel | A47J 37/0713 126/25 R |
| 2005/0155596 A1 | * | 7/2005 | Andrews | A47J 37/0763 126/25 R |
| 2006/0016447 A1 | * | 1/2006 | Meyer | A47J 36/06 126/276 |
| 2007/0125358 A1 | * | 6/2007 | Tripp | A47J 37/0704 126/50 |
| 2012/0247447 A1 | * | 10/2012 | Cross | A47J 37/0786 126/25 R |

* cited by examiner

*Primary Examiner* — Grant Moubry
*Assistant Examiner* — Aaron H Heyamoto
(74) *Attorney, Agent, or Firm* — Davis & Bujold PLLC; Charles Holoubek

(57) ABSTRACT

A stadium barbecue grill comprising an upper hood and a lower base defining an interior of the grill, a grid cooking surface with an indicia of an American football field; and an exterior indicia of an American football stadium attached to the hood.

6 Claims, 2 Drawing Sheets

STADIUM BARBEQUE GRILL

CROSS REFERENCE TO RELATED APPLICATIONS/PRIORITY

The present invention claims priority to U.S. Provisional Patent Application No. 62/168,176, filed on May 29, 2015, which is incorporated by reference in its entirety into the present disclosure as if fully restated herein. To the extent that there is any conflict between the incorporated material and the present disclosure, the present disclosure will control.

BACKGROUND OF THE INVENTION

Field of the Invention

The present invention relates to barbecue grills and specifically to grills used to simultaneously cook food and evoke team spirit and identity.

Description of Related Art

Tailgating is a pre-game ritual, especially popular in the American South, where fan socializing and barbecuing food are central aspects to tailgating in preparation for an American football game (hereinafter "football"). In many ways, tailgating is a rite which encourages fan loyalty and almost tribal identity with the sports team and totems and symbols of the team. One of the most powerful and hallowed symbols of a football team is the team's stadium. For example, the sight of Tiger Stadium in Baton Rouge can evoke a real, physiological and emotional response from many adherent LSU fans. However, current barbecue grills function merely to cook food, and do not address enhancing team identity by relating to the one structure having unique mystique to a fan, which is the team's stadium.

SUMMARY OF THE INVENTION

Wherefore, it is an object of the present invention to overcome the above mentioned shortcomings and drawbacks associated with the prior art.

The disclosed stadium barbecue grill is a preferably outdoor grill cooker that has indicia of an interior of a football stadium in the interior of the grill and indicia of an exterior of the football stadium on the exterior of the barbecue grill. Preferably, the exterior of the barbecue grill will have indicia of a specific football stadium and the interior will have logos, symbols, or other indicia of a specific football team, college or professional for example, whose home field is that stadium. However indicia of a generic American football stadium on the interior and/or exterior of the barbecue grill is also within the scope of the disclosed invention. Such a generic football stadium grill would still be more symbolically representative of the game than an ordinary grill, and thus would still convey a level of social status and emotional utility to the fan, and would enhance the entertainment experience of tailgating, even if it conveyed less of an enhancement than provided by the embodiment of the grill resembling the fan's favorite team's stadium.

The interior of the stadium barbecue grill preferably symbolizes a football field on the lowest level grid cooking surface. This lowest level is surrounded by successively higher grid cooking surface levels, appearing as stands around the football field's lower grid. The field level lower grid will preferably have a grid shape that is marked symbolically with "yard lines" in, for example, one, five, 10, or 20 "yard" increments. The field level lower grid would preferably be customized to incorporate specific logos, for example at midfield, the end zone, and around the 25 yard mark, of a specific professional or college football teams and/or the team's conference and/or league.

Externally, the stadium barbecue grill is an outdoor barbecue grill cooker with a closing lid over a bottom fire pit base. The lid will have the appearance or indicia of a particular professional or college football stadium. The exterior appearance or indicia may be formed in or directly on the exterior of the hood, or the exterior indicia could be on an interchangeable bonnet that is fitted in some manner to the hood. The exterior indicia might be visual and consist of a 360 degree photograph of the particular stadium, which is attached to the hood or bonnet through, for example a latex or acrylic "wrap" covering the hood or bonnet surface. Additionally, the exterior indicia could be contoured and consist of a three-dimensional model of the particular stadium formed in the hood or bonnet.

The stadium barbecue grill is intended to provide tailgating participants with a grill that resembles inside and out the stadium that the fans are about to enter to see a football game, after participating in a tailgate party. The stadium barbecue grill will be an additional fan exhibition item and conversation piece that will enhance the enjoyment of the tailgating experience and provide enhanced fan identity and thus group social utility to the owner football fan for virtually any chosen team.

The various parts of the stadium barbecue grill all work together to give the appearance of a simulated football field and stands internally when the hood is open, with specific team markings on the "field level" grid, and of a particular stadium externally when the cooking hood is closed. The stadium barbecue grill replaces an ordinary outdoor grill with what appears, at least in part, to be a miniature football stadium, which in turn adds to the team-loyalty and enjoyment for the fan using it.

Another object of the present invention is to potentially provide additional football theme design features such as marking the sides of the elevating walls supporting the field level grid or the lowest stands level grid opposite the hood opening and typical user vantage point with markings saying "Red Zone" starting at the two 20 yard lines outward through the respective end zones, to both indicate an area on the football field and, preferably, indicating a hottest cooking area on the grill (in conjunction with being the lowest level grid over areas where the burners below are higher or closer to the cooking surface to create maximum relative temperatures to the food being cooked). However, the "Red Zone" markings, field logos, and stands grids (having grids closer together to simulate stands) could be left out and the stadium barbecue grill still look like a stadium, but preferably the exterior indicia and inside football field shaped lowest grid would remain.

A further object of the present invention is to build loyalty and identity with team and increase fan enjoyment and emersion in a game day experience.

Yet another object of the present invention is to provide a stadium barbecue grill fueled by charcoal, gas (including natural gas and propane), infrared grills (including where propane or natural gas superheat a ceramic tile), and wood.

The present invention also relates to a stadium barbecue grill comprising a hood and a base defining an interior of the stadium barbecue grill, a grid cooking surface in the interior of the stadium barbecue grill with indicia of a football field and stands; and an external indicia of an American football stadium attached to an exterior of the hood.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which.

DETAILED DESCRIPTION OF THE INVENTION

The present invention will be understood by reference to the following detailed description, which should be read in conjunction with the appended drawings. It is to be appreciated that the following detailed description of various embodiments is by way of example only and is not meant to limit, in any way, the scope of the present invention.

Figure 1:
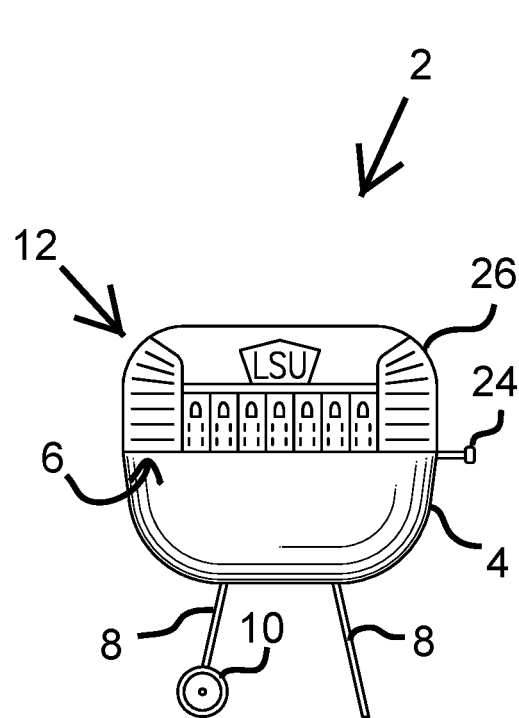
FIG. 1 is a side view of a stadium barbecue grill according to the present invention.
Figure 2:
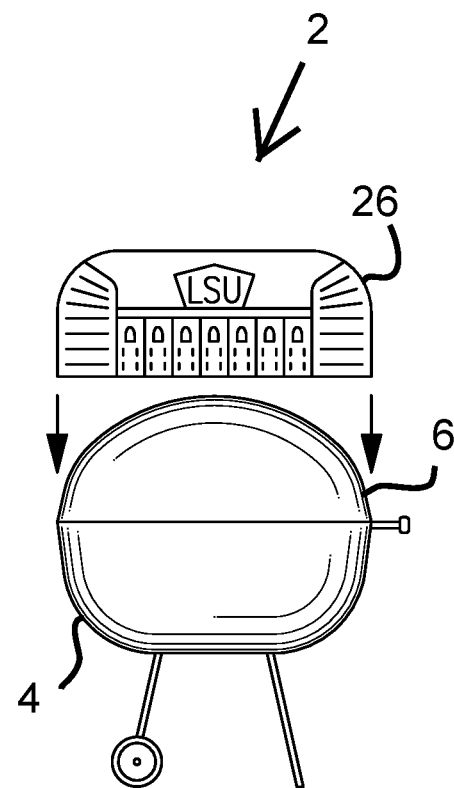
FIG. 2 is an exploded view of a the stadium barbecue grill of FIG. 1.

Turning now to FIGS. 1 and 2, a brief description concerning the various components of the present invention will now be briefly discussed. As can be seen in this embodiment the stadium barbecue grill 2 has a fire pit base 4 or bottom, a hood 6 or top, and a plurality of legs 8 and wheels 10 to support the base 4. In other embodiments the legs 8 and/or wheels 10 may be omitted. The various elements of the stadium barbecue grill 2 make the stadium barbecue grill 2 appear like either a generic or particular football stadium. The external indicia, whether visual 12 or contoured 14 or both 12, 14, are designed to make the exterior of the grill 2 appear like the outside of a particular stadium. In the interior of the stadium barbecue grill 2, as discussed below, the field level grid 16 cooking surface, shaped and marked like a lined football field, allows the internals of the grill 2 to look like a football field, whether generic like any given football field or marked with logos of a specific team. The grids 18, 20, 22 above and around the field level grid 16 are intended to look like the stands, and are an optional embodiment of the invention.

The hood 6 of the stadium barbecue grill 2 opens and closes with a hood handle 24 as with typical outdoor grills, but has external indicia 12, 14 of the exterior of a football stadium attached the exterior of the hood 6. In one embodiment, the exterior indicia 12, 14 is attached directly on or formed in a bonnet 26 that itself attaches to the hood 6. In another embodiment, discussed below, the exterior indicia 12, 14 is attached directly on or formed in the hood 6. The external indicia 12, 14 can be primarily visual 12 and flat in nature (i.e., substantially two dimensional), primarily contoured 14 (i.e., substantially three dimensional), or both 12, 14.

Figure 3:
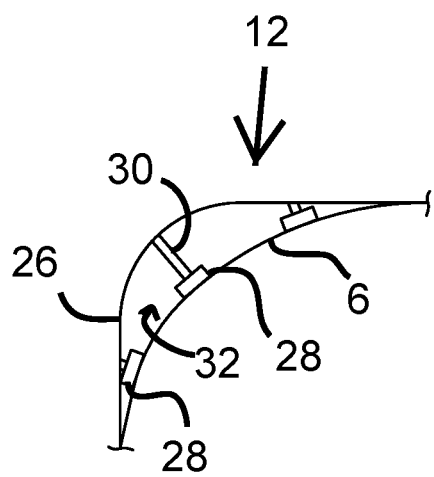
FIG. 3 is a partial cross sectional view of an upper surface of the hood and bonnet, with three spacers shown spacing the bonnet from the hood.
Figure 4:
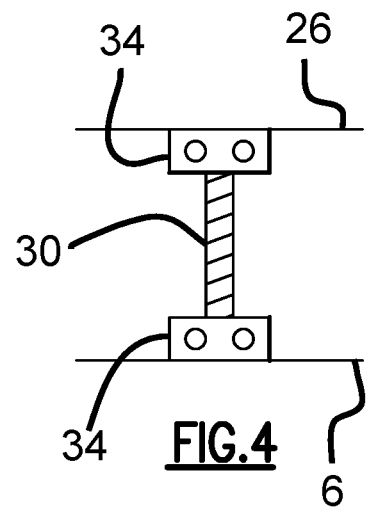
FIG. 4 is a close up partial side view of a spacer connecting a bonnet to a hood.

As shown in FIGS. 1 and 2, the bonnet 26 may be a thin metal covering that fits over and attaches to the hood 6. The bonnet 26 could also be formed of other materials of sufficient sturdiness and heat resilience like, for example, plastics or fiberglass. The bonnet 26 may mirror the shape of the hood 6 or, as shown in FIG. 2, may deviate from such shape. The exterior of the bonnet 26 may have a variety of shapes, such as a cuboid with rounded upper edges and corner (as shown) or a dome shape, each of which may be preferable shapes for visual external indicia 12 wraps of particular stadiums, or could have a contoured shape 14, as described in more detail below. The interior bonnet 26 surface may mate with the hood 6 surface, may be spaced with insulation 28, or as shown in FIG. 3, may preferably be spaced with elongated, insulated spacers 30 allowing a barrier of air 32 to insulate the bonnet 26 from the hood 6 similar to a radiant barrier.

The underside of the bonnet 26 may be coated with a reflective coating, like steel, tin, nickel, platinum, silver, gold, copper, brass, or aluminum, including polished, highly polished and foils of each, for example. The reflective coating would preferably have low emissivity, preferably less than 0.15, more preferably less than 0.10, and most preferably less than 0.05, in the range of 3.0 to 15 micrometers wavelength for electromagnetic radiation. The insulated spacers 30 provide structural support for the bonnet 26, radiant spacing to space the bonnet 26 from the hood 6, and insulation 28 where the spacers 30 contact to the hood 6 to minimize conduction of heat from the hood 6, through the spacers 30, to the bonnet 26. The air spacing and reflective coating creates a radiant barrier between the bonnet 26 and the hood 6, preventing the bonnet 26 from experiencing the extreme temperatures of the interior of the grill 2. In a further embodiment, the spacers 30 have adjustable lengths and/or angles such that a single bonnet 26 can fit multiple different sizes and shapes of hoods 6. To aid in such adjustable spacers 30, the spacers 30 could be retractable and extendable and could swivel, pivot, or otherwise lockably articulate at, for example, the connection between the spacer 30 and the bonnet 26. The spacers 30 support and connect the bonnet 26 to the hood 6 either fixedly or non-damaging removably.

Manners of connecting the spacer 30 to the hood 6 include, for example, one or more of being glued, screwed, latched, bolted, belt wrapped, friction secured or simply rested on, in, or to the hood 6. In addition to or in place of the first spacer insulation 28 adjacent to the connection of the spacer 30 to the hood 6, the spacers 30 may formed as structurally insulating, for example, at least partially hollow, preferably perforated, and with a thin skin from metal that readily radiates heat outward. This would help minimize the amount of heat conducted from the hood 6 through the spacer 30 to the bonnet. A second spacer insulation 28 may be placed adjacent to the connection of the bonnet 26 and the spacer 30 in addition or in place of the first spacer insulation 28.

As with other insulation 28 disclosed, the spacer insulation 28 may be formed from a material that has relatively low thermal conductivity. The level of thermal conductivity would be preferably less than 1.5, more preferably less than 0.5, and most preferably less than 0.1 watts per meter per Kelvin.

One variation of the spacer insulation 28 is an air insulated element 34. The air insulated element may be formed from a thin walled, preferably perforated metal box (or other preferably hollow shape) that connects the hood 6 or bonnet 26 on one side to the spacer 30 on the other. The air insulated element 34 would radiate off a large portion of the heat that entered (was conducted) from the hotter side before it reached or was conducted into the colder side. The air insulated element 34 may be used in addition to a material that has low thermal conductivity. That is, the air insulated element 34 could be attached to a material of low thermal conductivity, which is itself attached to the hood 6, bonnet 26, or spacer 34.

Additionally or alternatively, though not shown, a bottom periphery or circumference of the bonnet 26 may be attached to a bottom periphery or circumference of the hood 6, either directly, with spacers 30, and/or with a thermally insulated connection 28. This bottom periphery connection would allow for a continuous air spacing to space the bonnet 26 from the hood 6 along the entirety of the bonnet's convex interior, without any spacers 30 that may provide conduction bridges.

In the embodiment shown in FIGS. 1 and 2, on the lateral sides of the bonnet 26 the exterior indicia is a two-dimensional visual indicia 12 (a picture/illustration/photograph), and comprises a 360 degree representation of the exterior of the particular stadium. The particular stadium will preferably be associated with the team markings, including team totem, badge, logo, symbol, name, and regalia and school, city, or conference and/or league symbols and/or name in the interior of the stadium barbecue grill 2, especially on the field level grid 16 as described below. The top portion of the bonnet 26 may be substantially monochromatic, may be colored to suggest or indicate the sky (e.g., blue for day games or black for night games), or may depict an overhead or bird's eye view of a roof of the particular stadium or into the particular stadium.

In the embodiment shown, the visual external indicia 12 are attached externally to the bonnet 26 with, for example, an acrylic wrap of the particular stadium sealed on to the bonnet 26 all the way around as a 360 degree wrap. The bonnet 26 preferably substantially completely covers the exterior of the hood 6. The visual external indicia 12, which may be formed as an acrylic or other wrap covering the bonnet 26, serves to make the outside of the stadium barbecue grill 2 look like, at least partially, a miniature version of the selected actual stadium. The visual external indicia 12 in FIGS. 1 and 2 show an artist rendition of an actual stadium (LSU Tiger Stadium), used for illustrative purposes only, and could vary with each different team and stadium. The wraps may also be actual photographic wraps of a stadium, or drawings/illustrations, or some combination thereto. The visual external indicia 12 wrap material could be of any currently used commercial material, including acrylic or latex or other material based on level of thermal exposure, cost, and weather durability.

The bonnet 26 may be made from pressed, molded or otherwise shaped metal or other high temperature stable materials or composites such as high temperature plastics, including, for example, polyphenylene sulfides (e.g., Ryton®), polyimide-imides (e.g., Torlon®), polyetheretherketones (PEEK), and high-performance polyimides (e.g., Vespel®); high temperature foams, including silicone, silicone rubber, cured nitrile butadiene rubber binder with Aramid fiber. Additionally, a solid insulation 28 layer may be included between the hood 6 and the bonnet 26. Possible solid insulation 28 materials include mineral wools, glass wools, ceramic wools, ceramic coating, and vermiculite.

If a sufficient solid insulation 28 layer and/or radiant barrier is included between the hood 6 and the bonnet 26, the bonnet 26 could be formed from lower temperature stable materials and still maintain high levels of performance.

Figure 5:
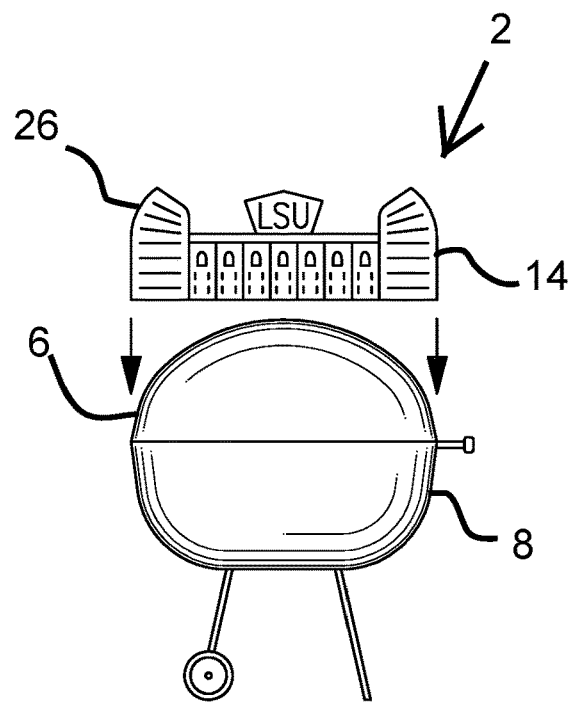
FIG. 5 is a side view of a second embodiment of the stadium barbecue grill with a bonnet having a contoured external indicia.

Turning now to FIG. 5 a second embodiment of the bonnet 26 is shown. In this embodiment, the external indicia 12, 14 is contoured 14 and forms a three dimensional model with shapes or physical features indicative of the particular stadium represented, here LSU Tiger Stadium just for example. The contoured external indicia 14 may be solid or hollow, and may be, for example, monochromatic, polychromatic, colored in the chosen team's color or colors, or have colors representing the actual colors of the physical stadium. For contoured external indicia 14 representing open aired stadiums, the top of the center of the contoured external indicia 14 would preferably be shaped and preferably illustrated as the football field itself. As a variation of this embodiment, the contoured external indicia 14 may also have visual external indicia 12 applied, in the form of drawings, photographs, or a combination of the two, for example, to further increase the realistic representation of the chosen stadium and further enhance the fan's entertainment experience.

In a further embodiment, the visual external indicia 12 may be directly applied to the hood 6 with thermal stable paint or coating. Alternatively, or additionally, the contoured external indicia 14 may be pressed or molded into the shape of the hood 6 itself. In this further embodiment no bonnet 26 is necessary.

Figure 6:
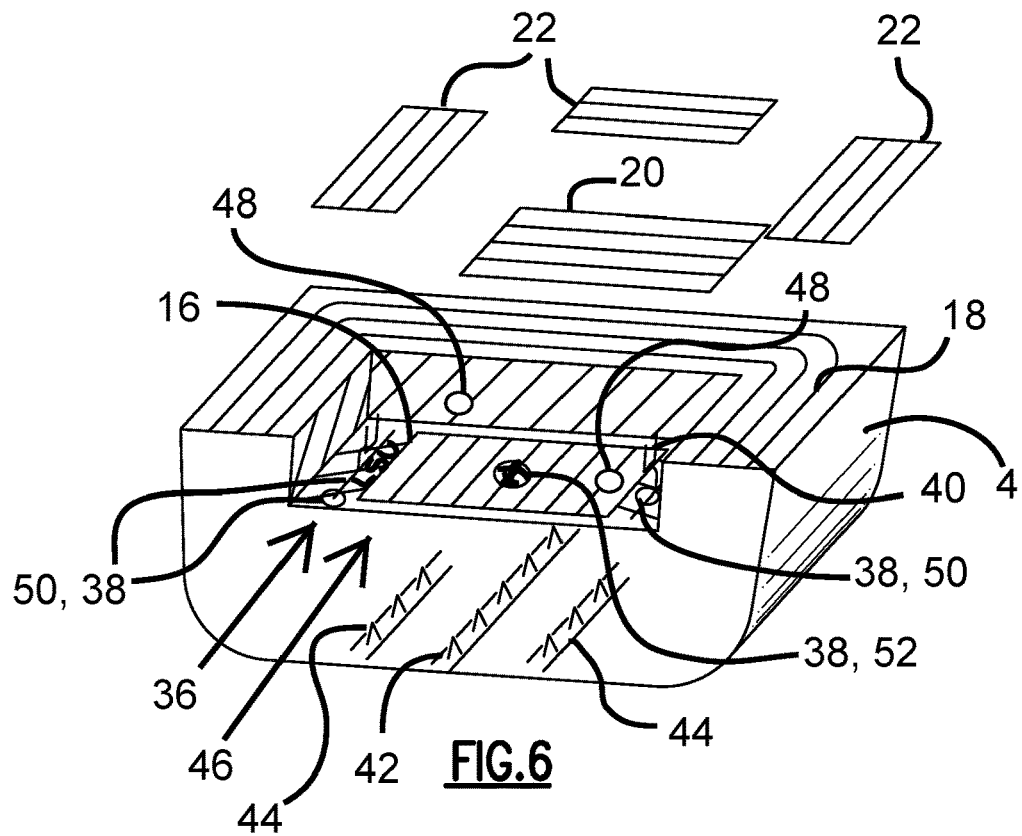
FIG. 6 is an exploded view of an interior of a stadium barbecue grill with internal indicia of a stadium, with the hood omitted for clarity.

Turning now to FIG. 6, an exploded view of the inside of the stadium barbecue grill 2 is shown. The cooking surface grids 16, 18, 20, 22 on the inside of the stadium barbecue grill 2 are arranged so as to resemble the interior of a football stadium, with a football field and preferably a plurality of levels of stadium stands represented by the various cooking surfaces 16, 18, 20, 22. The lowest cooking level is a grid substantially in proportionate length and width to a football field and is called a field level grid 16. Preferably at least some and preferably all of the field level grid 16 cooking grids are labeled as yard lines, preferably with the exception of the end zones 36. The end zones 36 and mid field areas may contain logos 38 of a particular professional or college football team (matched with its external indicia 12, 14 on the outside), ideally constructed from same metal used to form the grids 16, 18, 20, 22 themselves. The end zones 36 and out of bounds could be solid without grids, to provide a different cooking surface and to highlight the playing field portion of the field level grid 16.

Goalposts 40 of the same or different metal material as the grids 16, 18, 20, 22 would preferably be located on the left and right ends of the field level grid 16, at the back center of the end zones 36, to simulate football goal posts and would serve as handles to lift the field level grid 16 out of the base 4. The goalpost 40 would preferably be colored yellow or white and shaped with one or two vertical portions extending up from the field level grid 14, curving forward and connecting to or bisecting a crossbeam that extends laterally with two vertically upward extending bars at each end of the cross beams, so as to better resemble real high school, college, or professional goal posts. The goal post handles 40 may be fixed to the field level grid 16 or be removable. Higher (and therefore lower cooking temperatures) cooking grids (starting with lower level grids 18) are arranged around the far side and behind end zone sides of the field level grid 16 that may be generic as to teams but have cooking grids preferably closer together than the field level grid 16 so as to take on the appearance of the stands of a football stadium. One or more higher level cooking surfaces (mid level grid 20 and upper level grid 22) would appear like "mid level" and "upper decks" in a stadium and be used to more slowly cook or to keep warm food in the grill 2. Each element will be described in greater detail below.

The location of the burners or heating elements 42, 44 may vary. In the embodiment shown, the lowest level burners 42 run in a single row from the front to back of the middle of the cooker with the location of the flame outlets may be indicated by a circle symbol, a flame symbol, or a bar with flame symbols. The actual levels and locations of the burners, and fuel source may vary.

In the embodiment shown, upper burners 44, the vertically highest level of burners, run in two rows from the front to back of each end of the cooker with the location of the flame outlets indicated by a circle symbol, a flame symbol, or a bar with flame symbols. The actual levels and locations of the upper burners may vary. The resulting closest proximity of a burner to a cooking surface grid will normally be the hottest cooking areas. In the embodiment shown, these hottest cooking areas are the areas under the field level grid between the 20-yard lines and end lines of the end zones, marked and described as the "Red Zone" 46 on the Red Zone Medallions 48 described below.

Of the, for example, four levels of cooking surfaces or grids 16, 18, 20, 22, the lowest level cooking grid, also called the field level grid 16, consists of one large grid that has at least a partial appearance of a football field, including a length preferably longer than the width. The ratio of the length to width will preferably range from 1.5 to 3, more preferably 2.0 to 2.5, most preferably will be around 2.25, which is the ratio of length to width of an regulation football field (360 feet/160 feet; including the end zones, not including sidelines). To a regular tailgater, such a ratio of around 2.25 will naturally and subconsciously evoke the feeling that the field level grid 16 is a miniaturized football field and will provide emotional utility because of such association.

At opposed elongate ends of the field level grid 16 are end zone areas 36. Optionally, along the elongate sides are sideline areas with the spacing of the grid simulating and marked at, for example, five-yard line intervals on a football field. The perimeter of the field level grid 16 preferably extends upward with vertical sides to laterally contain items being cooked thereon and connect the field level grid 16 to the lower stands level grids 18 described below.

A substantially flat metal medallion 50 is attached to or integral with each of the end zones 36 of the field level grid 16 as an end zone medallion 50. The end zone medallions 50 may contain replicas of the logos, team name, and/or markings of the particular team, preferably similar to the manner in which that team's end zone is actually decorated or marked in that team's actual stadium. The logos 38 in the embodiment in FIG. 6 are for illustrative purposes only and would vary with each different team and stadium, and could include multiple team logos in a single grill 2 embodiment.

A substantially flat metal mid-field medallion 52 is attached in the center of the field level grid 16 and contains a replica of the logo 38 and/or other markings of the particular team, especially a marking that the chosen team's mid-field is actually decorated or marked in that team's actual stadium. The logo 38 on the mid-field medallion 52 shown is for illustrative purposes only and would vary with each different team and stadium.

The second lowest level cooking grids, of the four cooking levels in this embodiment, is termed the lower level stands grids 18. This lower level stands grids 18 cooking level surrounds the field level grid 16 on preferably three sides, though it could surround on all four sides or just one or two sides. These lower level stands grids 18 have the appearance of the stands of a football stadium with the spacing of the grids being preferably substantially one-half as wide as the spacing on the field level grid and simulating the rows of seats in the stands. The backs of the grids 18 preferably fold upward with vertical sides to contain items being cooked from rolling or falling off. The actual number and shape of the lower level stands grid 18 may vary.

Second highest level cooking grid, of four cooking levels in this embodiment, is termed the mid-level stands grids 20. These grids 20 may have the same general appearance and rear upward folds as on the lower stands grids 18 or may extend over the middle of the field level grid 16 and extend to left or right sides of the interior of the stadium barbecue grill 2, as depicted in FIG. 6. It is noted that in one variation of the stadium barbecue grill 2, this mid-level stands grids 20 is omitted, leaving the other cooking surface levels described herein.

The highest level cooking grids of four cooking levels in this embodiment are termed the upper level stands grids 22. These grids 22 arrangements resemble an upper deck in a football or baseball stadium. The upper level stands grids 22 preferably have the same general and rear upward folds as the lower level stands grids 18 and the mid-level stands grids 20. Because the upper level stands grids 22 are the furthest vertically separated from the burners, this highest cooking surface functionally serves to keep food warm or very slowly cook food as "keep warm" grids do in ordinary barbecue grill cookers.

Vertical metal red zone medallions 54 are attached on each of the vertical sides of the field level grid on each end between the 20-yard line markings and the back of the end zones. These help to indicate the hottest cooking areas, when the burners are arranged as such, and correlates with the area on a football field known as the Red Zone 46, the area between the 20 yard line and the goal line. As shown, the red zone medallions 48 could also be placed horizontally on the field level grid 16 at the same or similar red zone 46 location along the "field."

The grids 18, 20, 22 of the stands around the field level grid 16 could be of almost any shape and could be arranged in various configurations at various levels, both absolute or relative to each other, based upon utility and cooking function elements, balanced by a level of evocation of a general or particular stadium interior. The various grids 16, 18, 20, 22 would be made of common grid materials, for example, steel, iron, chrome-plated steel, cast iron, porcelain-coated steel, porcelain-coated cast iron, and stainless steel.

Examples of college football stadiums that may be depicted with the stadium barbeque grill 2 are New Mexico State's Aggie Memorial Stadium in Las Cruces, N. Mex.; UTSA's Alamodome in San Antonio, Tex.; Boise State's Albertsons Stadium in Boise, Id.; Hawaii's Aloha Stadium in Honolulu, Hi.; Boston College's Alumni Stadium in Chestnut Hill, Mass.; TCU's Amon G. Carter Stadium in Fort Worth, Tex.; North Texas's Apogee Stadium in Denton, Tex.; Arizona's Arizona Stadium in Tucson, Ariz.; Oregon's Autzen Stadium in Eugene, Oreg.; Wake Forest's BB&T Field in Winston-Salem, N.C.; Penn State's Beaver Stadium in University Park, Pa.; Florida's Ben Hill Griffin Stadium in Gainesville, Fla.; Kansas State's Bill Snyder Family Football Stadium in Manhattan, Kans.; Florida State's Bobby Bowden Field at Doak Campbell Stadium in Tallahassee, Fla.; Georgia Tech's Bobby Dodd Stadium at Historic Grant Field in Atlanta, Ga.; Oklahoma State's Boone Pickens Stadium in Stillwater, Okla.; NIU's Huskie Stadium in DeKalb, Ill.; UCF's Bright House Networks Stadium in Orlando, Fla.; Alabama's Bryant-Denny Stadium in Tuscaloosa, Ala.; Fresno State's Bulldog Stadium in Fresno, Calif.; Maryland's Byrd Stadium in College Park, Md.; Louisiana-Lafayette's Cajun Field in Lafayette, La.; California's California Memorial Stadium in Berkeley, Calif.; Wisconsin's Camp Randall Stadium in Madison, Wis.; Syracuse's Carrier Dome in Syracuse, N.Y.; North Carolina State's Carter-Finley Stadium in Raleigh, N.C.; Arkansas State's Centennial Bank Stadium in Jonesboro, Ark.; Kentucky's Commonwealth Stadium in Lexington, Ky.; Texas's Darrell K Royal-Texas Memorial Stadium in Austin, Tex.; Mississippi State's Davis Wade Stadium in Starkville, Miss.; Kent State's Dix Stadium in Kent, Ohio; East Carolina's Dowdy-Ficklen Stadium in Greenville, N.C.; Bowling Green's Doyt Perry Stadium in Bowling Green, Ohio; Air Force's Falcon Stadium in Colorado Springs, Colo. Missouri's Faurot Field in Columbia, Mo.; Florida Atlantic's FAU Stadium in Boca Raton, Fla.; FIU's FIU Stadium in Miami, Fla.; Colorado's Folsom Field in Boulder. Colo.; Old Dominion's Foreman Field in Norfolk, Va.; Oklahoma's Gaylord Family Oklahoma Memorial Stadium in Norman, Okla.; Georgia State's Georgia Dome in Atlanta, Ga.; SMU's Gerald J. Ford Stadium in University Park, Tex.; UMass's Gillette Stadium in Foxborough, Mass.; Toledo's Glass Bowl in Toledo, Ohio; Pittsburgh's Heinz Field in Pittsburgh, Pa.; Rutgers's High Point Solutions Stadium in Piscataway, N.J.; Western Kentucky's Houchens Industries-L. T. Smith Stadium in Bowling Green, Ky.; Washington's Husky Stadium in Seattle, Wash.; Iowa State's Jack Trice Stadium in Ames, Iowa; Texas State's Jim Wacker Field at Bobcat Stadium in San Marcos, Tex.; Marshall's Joan C. Edwards Stadium in Huntington, W. Va.; Louisiana Tech's Joe Aillet Stadium in Ruston, La.; Houston's John O'Quinn Field at TDECU Stadium in Houston, Tex.; Middle Tennessee's Johnny "Red" Floyd Stadium in Murfreesboro, Tenn.; Texas Tech's Jones AT&T Stadium in Lubbock, Tex.; Auburn's Jordan-Hare Stadium in Auburn, Ala.; Central Michigan's Kelly/Shorts Stadium in Mount Pleasant, Mich.; North Carolina's Kenan Memorial Stadium in Chapel Hill, N.C.; Idaho's Kibbie Dome in Moscow, Id.; Appalachian State's Kidd Brewer Stadium in Boone, N.C.; Iowa's Kinnick Stadium in Iowa City, Iowa; Texas A&M's Kyle Field in College Station, Tex.; South Alabama's Ladd Peebles Stadium in Mobile, Ala.; Virginia Tech's Lane Stadium in Blacksburg, Va.; BYU's LaVell Edwards Stadium in Provo, Utah; Memphis's Liberty Bowl Memorial Stadium in Memphis, Tenn.; Temple's Lincoln Financial Field in Philadelphia, Pa.; Southern California's Los Angeles Memorial Coliseum in Los Angeles, Calif.; Nevada's Mackay Stadium in Reno, Nev.; Louisiana-Monroe's Malone Stadium in Monroe, La.; Washington State's Martin Stadium in Pullman, Wash.; Baylor's McLane Stadium in Waco, Tex.; Clemson's Memorial Stadium in Clemson, S.C.; Illinois's Memorial Stadium in Champaign, Ill.; Indiana's Memorial Stadium in Bloomington, Ind.; Kansas's Memorial Stadium in Lawrence, Kans.; Nebraska's Memorial Stadium in Lincoln, Nebr.; Army's Blaik Field at Michie Stadium in West Point, N.Y.; Michigan's Michigan Stadium in Ann Arbor, Mich.; West Virginia's Mountaineer Field at Milan Puskar Stadium in Morgantown, W. Va.; Navy's Navy-Marine Corps Memorial Stadium in Annapolis, Md.; Tennessee's Neyland Stadium in Knoxville, Tenn.; Cincinnati's Nippert Stadium in Cincinnati, Ohio; Notre Dame's Notre Dame Stadium in Notre Dame, Ind.; Ohio State's Ohio Stadium in Columbus, Ohio; Louisville's Papa John's Cardinal Stadium in Louisville, Ky.; Georgia Southern's Paulson Stadium in Statesboro, Ga.; Ohio's Peden Stadium in Athens, Ohio; San Diego State's Qualcomm Stadium in San Diego, Calif.; USF's Raymond James Stadium in Tampa, Fla.; Arkansas's Donald W. Reynolds Razorback Stadium, Frank Broyles Field in Fayetteville, Ark.; Connecticut's Rentschler Field in East Hartford, Conn.; Oregon State's Reser Stadium in Corvallis, Oreg.; Rice's Rice Stadium in Houston, Tex.; Utah's Rice-Eccles Stadium in Salt Lake City, Utah; North Carolina's Jerry Richardson Stadium in Charlotte, N.C.; Southern Miss's M. M. Roberts Stadium in Hattiesburg, Miss.; Utah State's Romney Stadium in Logan, Utah; UCLA's Rose Bowl in Pasadena, Calif.; Purdue's Ross-Ade Stadium in West Lafayette, Ind.; Northwestern's Ryan Field in Evanston, Ill.; Eastern Michigan's Rynearson Stadium in Ypsilanti, Mich.; UNLV's Sam Boyd Stadium in Whitney, Nev.; Georgia's Sanford Stadium in Athens, Ga.; Ball State's Scheumann Stadium in Muncie, Ind.; Virginia's Scott Stadium in Charlottesville, Va.; Tulsa's Skelly Field at H. A. Chapman Stadium in Tulsa, Okla.; Colorado State's Sonny Lubick Field at Hughes Stadium in Fort Collins, Colo.; Michigan State's Spartan Stadium in East Lansing, Mich.; San Jose State's Spartan Stadium in San Jose, Calif.; Stanford's Stanford Stadium in Stanford, Calif.; Akron's Summa Field at InfoCision Stadium in Akron, Ohio; UTEPs Sun Bowl stadium in El Paso, Tex.; Arizona State's Sun Devil Stadium, Frank Kush Field in Tempe, Ariz.; Miami's Sun Life Stadium in Miami Gardens, Fla. Minnesota's TCF Bank Stadium in Minneapolis, Minn.; LSU's Tiger Stadium in Baton Rouge, La. New Mexico's University Stadium in Albuquerque, N. Mex.; Buffalo's UB Stadium in Amherst, N.Y.; Vanderbilt's Vanderbilt Stadium in Nashville, Tenn.; Mississippi's Vaught-Hemingway Stadium in Oxford, Miss.; Troy's Veterans Memorial Stadium in Troy, Ala.; Western Michigan's Waldo Stadium in Kalamazoo, Mich.; Duke's Wallace Wade Stadium in Durham, N.C.; Wyoming's War Memorial Stadium in Laramie, Wyo.; UMass's Warren McGuirk Alumni Stadium in Hadley, Mass.; South Carolina's Williams-Brice Stadium in Columbia, S.C.; Miami (OH)'s Yager Stadium in Oxford, Ohio; and Tulane's Benson Field at Yulman Stadium in New Orleans, La.

Examples of professional football stadiums that may be depicted with the stadium barbeque grill 2 are the New York Giants' and New York Jets' MetLife Stadium in East Rutherford, N.J.; the Green Bay Packers' Lambeau Field in Green Bay, Wis.; the Dallas Cowboys' AT&T Stadium in Arlington, Tex.; the Kansas City Chiefs' Arrowhead Stadium in Kansas City, Mo.; the Washington Redskins' FedEx Field in Landover, Md.; the Denver Broncos' Sports Authority Field at Mile High in Denver, Colo.; the Miami Dolphins' Sun Life Stadium in Miami Gardens, Fla.; the Carolina Panthers' Bank of America Stadium in Charlotte, N.C.; the New Orleans Saints' Mercedes-Benz Superdorne in New Orleans, La.; the Cleveland Browns' FirstEnergy Stadium in Cleveland, Ohio; the Buffalo Bills' Ralph Wilson Stadium in Orchard Park, N.Y.; the San Diego Chargers' Qualcomm Stadium in San Diego, Calif.; the Atlanta Falcons' Georgia Dome in Atlanta, Ga.; the Houston Texans' NRG Stadium in Houston, Tex.; the Baltimore Ravens' M&T Bank Stadium in Baltimore, Md.; the Philadelphia Eagles' Lincoln Financial Field in Philadelphia, Pa.; the Tennessee Titans' LP Field in Nashville, Tenn.; the New England Patriots' Gillette Stadium in Foxborough, Mass.; the San Francisco 49ers' Levi's Stadium in Santa Clara, Calif.; the Jacksonville Jaguars' EverBank Field in Jacksonville, Fla.; the Seattle Seahawks' CenturyLink Field in Seattle, Wash.; the Tampa Bay Buccaneers' Raymond James Stadium in Tampa, Fla.; the Cincinnati Bengals' Paul Brown Stadium in Cincinnati, Ohio; the St. Louis Rams' Edward Jones Dome in St. Louis, Mo.; the Pittsburgh Steelers' Heinz Field in Pittsburgh, Pa.; the Detroit Lions' Ford Field in Detroit, Mich.; the Arizona Cardinals' University of Phoenix Stadium in Glendale, Ariz.; the Oakland Raiders' O.co Coliseum in Oakland, Calif.; the Indianapolis Colts' Lucas Oil Stadium in Indianapolis, Ind.; the Chicago Bears' Soldier Field in Chicago, Ill.; and the Minnesota Vikings' TCF Bank Stadium in Minneapolis, Minn.

In the outdoor grill 2, the bonnet or hood 6 and the field and stands grids 16, 18, 20, 22 take on the appearance of either a generic or specific football stadium and could potentially be interchangeable for different stadiums and different football teams, both internally and externally.

It is noted that though the barbecue grill 2 comprising both the external indicia and the internal indicia and arrangement convey by far the greatest amount of utility and function, a barbecue grill 2 with the external indicia alone or the internal indicia and arrangement alone would also convey utility and enhance the entertainment experience of tailgating for the fan. Indeed, and for example, a bonnet with external indicia is considered a distinct protectable aspect of the invention. Additionally, the internal grid arrangement, including the field level grid, is considered a distinct protectable aspect of the invention.

While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the imitative sense.

I claim:

1. A stadium barbecue grill comprising;
   an upper hood and a lower base defining an interior of the grill;
   a lower cooking surface positioned within the lower base, the lower cooking surface having an internal indicia of an American football field, wherein the internal indicia of the American football field comprises one or more of logos, symbols, and names of an American football team, and numbered markings including 10, 20, 30, 40, and 50 to represent a field level; and
   a bonnet removably attached to the upper hood, wherein the bonnet comprises an exterior indicia of an American football stadium on a wrap, creating a 360 degree representation of an exterior of the American football stadium in the form of one of a photograph, a drawing, and a three-dimensional shape having identifying physical features of the exterior of an existing high school, college, or professional American football stadium, wherein the bonnet is spaced away from the upper hood using adjustable length spacers to create a radiant barrier, wherein the spacers are configured to allow the bonnet to be removably attached to the upper hood.

2. The stadium barbecue grill of claim 1 wherein the indicia of the American football field includes a lower cooking surface having a shape that has a ratio of a length to width between 1.5 and 3.0.

3. The stadium barbecue grill of claim 1 wherein the interior of the lower base further comprises a plurality of cooking level grids vertically above the lower cooking surface.

4. The stadium barbecue grill of claim 1 further comprising a level of insulation material arranged between the bonnet and the hood.

5. The stadium barbecue grill of claim 1 further comprising the bonnet being attached to the hood along a lower periphery of each.

6. The stadium barbecue grill of claim 1 wherein the spacers are designed to swivel, pivot, or otherwise lockably articulate with respect to the bonnet.

* * * * *